(12) United States Patent
Diab (10) Patent No.: US 7,851,938 B2
(45) Date of Patent: Dec. 14, 2010

(54) MIDSPAN POWERING WITHOUT THE USE OF DATA TRANSFORMERS IN A POWER OVER ETHERNET APPLICATION

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 599 days.

(21) Appl. No.: 11/860,583

(22) Filed: Sep. 25, 2007

(65) Prior Publication Data

US 2009/0079558 A1    Mar. 26, 2009

(51) Int. Cl.
*H02J 3/02* (2006.01)
(52) U.S. Cl. .......................................... 307/2
(58) Field of Classification Search .......... 307/2
See application file for complete search history.

(56) References Cited

U.S. PATENT DOCUMENTS 7,057,899 B2 * 6/2006 AbuGhazaleh et al. ...... 361/780

FOREIGN PATENT DOCUMENTS

WO    WO 2006/052360 A1    5/2006

OTHER PUBLICATIONS

David Law and Wael William Diab, "100BASE-T normative 350uH inductance specification and IEEE P802.3at," IEEE P802.3at DTE Power Enhancements Task Force, Jul. 16-19, 2007.

* cited by examiner

*Primary Examiner*—Robert L. Deberadinis
(74) *Attorney, Agent, or Firm*—Duane S. Kobayashi (57) ABSTRACT

A midspan power sourcing equipment (PSE) for operation with power over Ethernet (PoE). The midspan PSE provides powering over wire pairs that are also used for data communication. To reduce costs by the midspan manufacturer, the midspans can be designed without the use of data transformers. Rather, midspans can include transmit/receive couplers that have blocking capacitors and divider trees for the insertion of power.

16 Claims, 7 Drawing Sheets

FIG. 1

PRIOR ART

FIG. 2

PRIOR ART

FIG. 3

NON-PSE SWITCH

MIDSPAN EQUIPMENT

POWERED DEVICE

PRIOR ART

MIDSPAN POWERING WITHOUT THE USE OF DATA TRANSFORMERS IN A POWER OVER ETHERNET APPLICATION

BACKGROUND

1. Field of the Invention

The present invention relates generally to Power over Ethernet (PoE) and, more particularly, to midspan powering without the use of data transformers in a PoE application.

2. Introduction

The IEEE 802.3af and 802.3at PoE specifications provide a framework for delivery of power from power sourcing equipment (PSE) to a powered device (PD) over Ethernet cabling. In this framework, various PDs can be deployed such as voice over IP (VoIP) phones, wireless LAN access points, network cameras, computing devices, etc.

In the PoE process, a valid device detection is first performed. This detection process identifies whether or not it is connected to a valid device to ensure that power is not applied to non-PoE capable devices. After a valid PD is discovered, the PSE can optionally perform a Layer 1 power classification.

Figure 1:
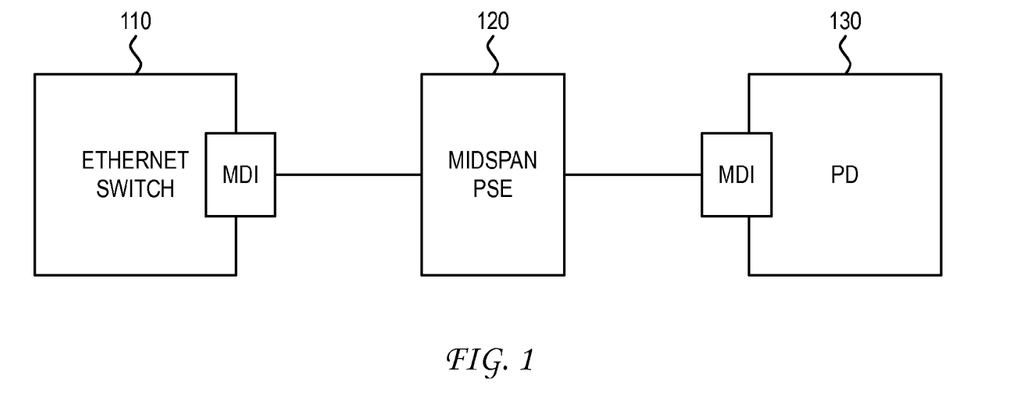
FIG. 1 illustrates an example of the inclusion of a midspan PSE in an MDI link.

In one configuration, power can be sourced directly from data terminal equipment such as an Ethernet switch. This type of network device is referred to as an endspan device. In another configuration, power can be supplied by a midspan device. FIG. 1 illustrates such a midspan configuration, which includes a medium dependent interface (MDI) link between Ethernet switch 110 and PD 130. As illustrated, midspan PSE 120 is placed in the middle of the MDI link for the insertion of power to be supplied to PD 130. An advantage of such a midspan configuration is the usage of legacy Ethernet switches that do not have PoE capabilities.

In one midspan configuration that supports 100BASE-TX, data is transmitted using pins 1 (TX+), 2 (TX−), 3 (RX+), and 6 (RX−) of the Ethernet cable. The remaining pins 4, 5, 7, and 8, which are representative of the two unused pairs of the Ethernet cable, can be used by midspan PSE 120 for the transmission of power to PD 130.

In an alternative midspan configuration, power is not transmitted on the two unused pairs, but transmitted on the two signal pairs used for data transmission. In this configuration, data transformers are included within the midspan to facilitate the insertion of power onto the two signal pairs. The inclusion of these data transformers into the midspan can represent a significant cost to midspan manufacturers. What is needed therefore is a mechanism for facilitating midspan powering through the two signal pairs, while maintaining efficiency in areas such as cost.

SUMMARY

Midspan powering without the use of data transformers in a PoE application, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 2:
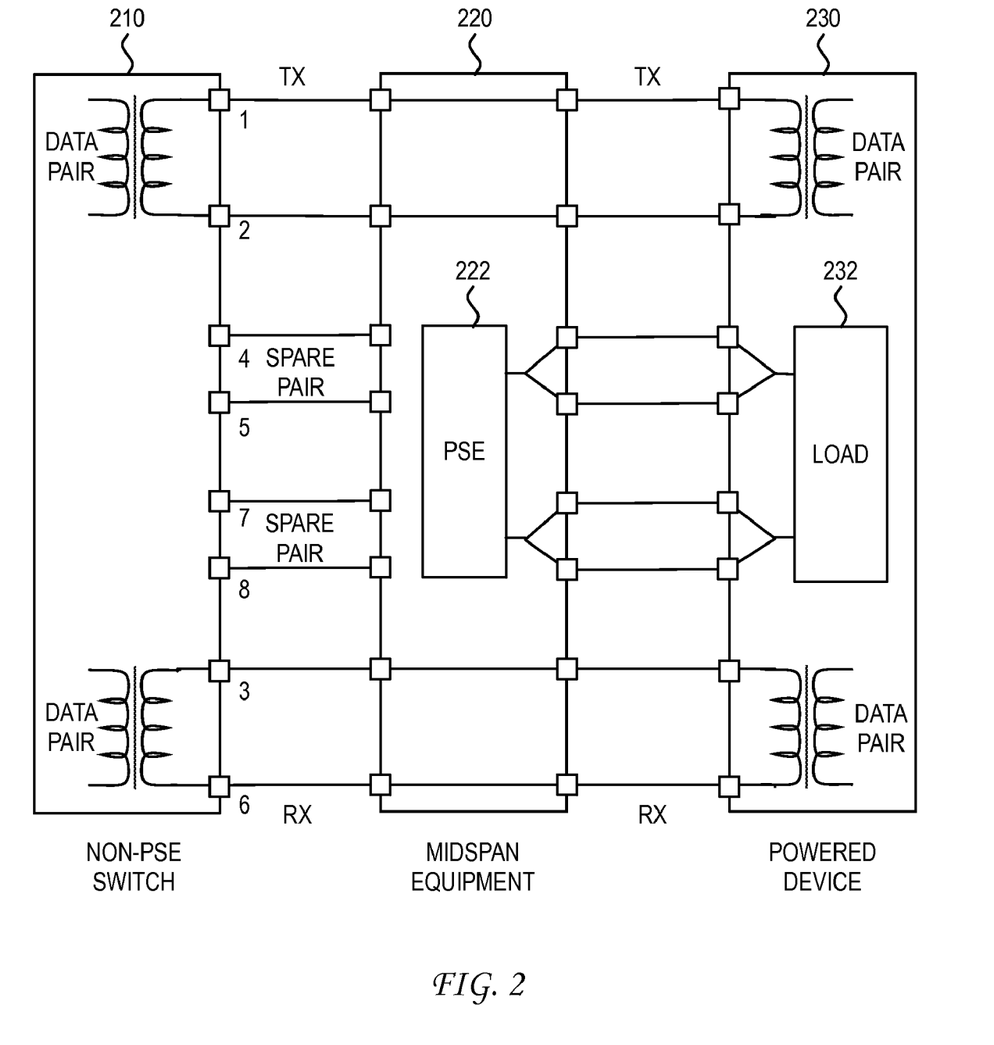
FIG. 2 illustrates an embodiment of powering a PD by midspan equipment using unused wire pairs.

FIG. 2 illustrates an example of a midspan PoE configuration that uses the two unused wire pairs for the transmission of power to the PD (referred to as Alternative B). As illustrated, the two unused wire pairs are terminated at midspan equipment 220. The remainder of the link of the two unused wire pairs is then used to transmit power from PSE 222 to PD 230. As power is inserted onto the link by midspan equipment 220, Ethernet switch 210 need not have PoE capabilities. Ethernet switch 210 can therefore represent legacy Ethernet equipment. In general, a PD is capable of receiving power from either wire pair in 802.3af and two-pair powering in 802.3at.

In a four-pair Ethernet cable, two signal wire pairs can be used for data transmission. In one implementation such as 100BASE-TX, pins 1 (TX+) and 2 (TX−) are used for the transmission (TX) portion of the link, while pins 3 (RX+) and 6 (RX−) are used for the receiving (RX) portion of the link. Pins 4, 5, 7, and 8 represent the two unused wire pairs, which are not used in the portion of the link between Ethernet switch 210 and midspan equipment 220.

At midspan equipment 220, power is inserted using PSE 222. Specifically, PSE 222 provides power to PD 230 using the two unused wire pairs (pins 4, 5, 7, and 8), which are terminated at midspan equipment 220. The power carried on the two unused wire pairs is then extracted at PD 230 to power load 232.

As further illustrated in FIG. 2, the two signal wire pairs used for data transmission (pins 1, 2, 3, and 6) are passed through midspan equipment 220 onto PD 230. This pass-through connection can be implemented as an undisrupted channel connection between Ethernet switch 210 and PD 230. In other words, the characteristics of the wired channel connection between Ethernet switch 210 and PD 230 can be left largely undisturbed as the data transmissions pass through midspan equipment 220.

Figure 3:
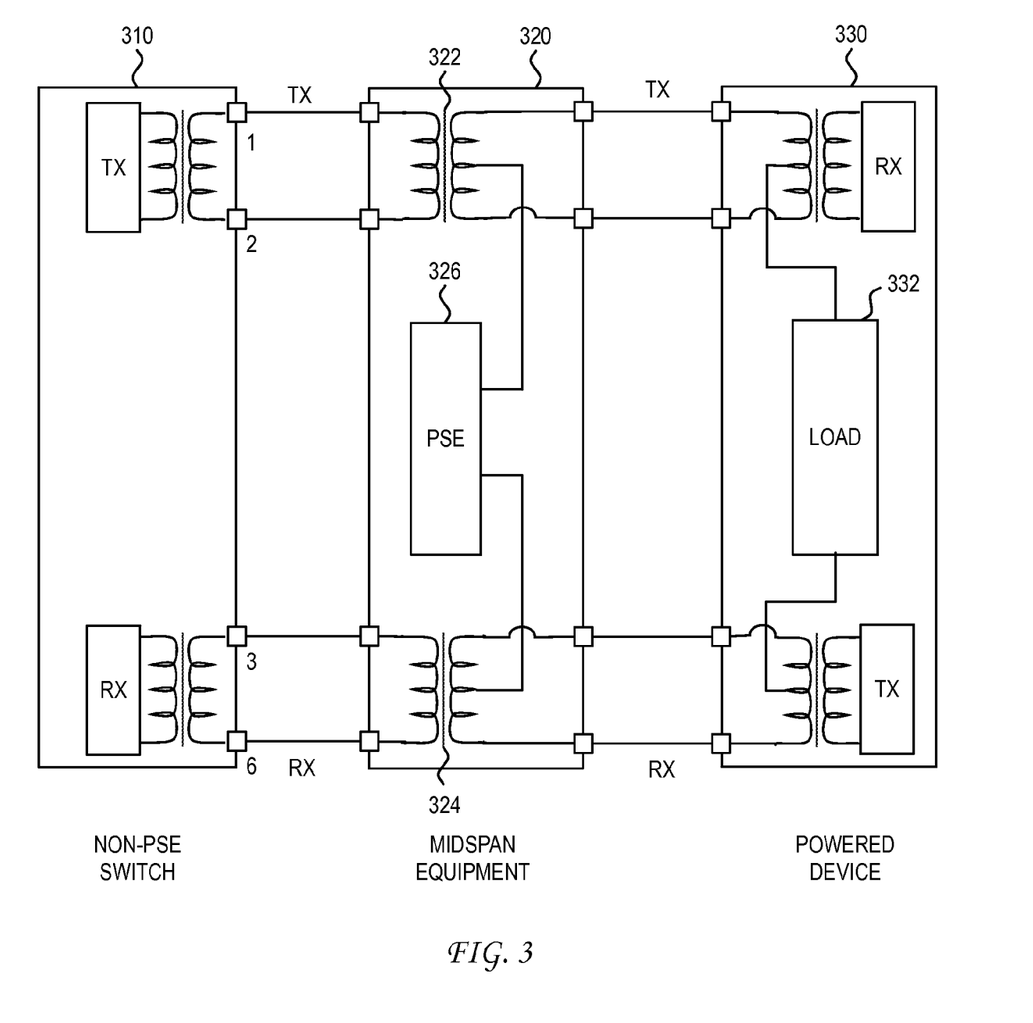
FIG. 3 illustrates an embodiment of powering a PD by midspan equipment using the data transmission signal wire pairs.

FIG. 3 illustrates an alternative midspan powering configuration that uses the two data transmission signal wire pairs for powering, instead of the two unused wire pairs. Thus, in the context of the example of FIG. 2, the two signal wire pairs represented by pins 1, 2, 3, and 6 can be used for both data transmission and powering. To facilitate this alternative midspan powering scheme, midspan equipment 320 adds data transformers 322, 324. As illustrated, PSE 326 inserts power onto the data transmission signal wire pairs through transformer taps on the end device side of the transformer.

Consider, for example, the signal wire pair represented by pins 1 and 2. In this signal wire pair, data is transmitted from Ethernet switch 310 and received at midspan equipment 320. After passing through data transformer 322, the data is then transmitted to PD 330. Similarly, for the signal wire pair represented by pins 3 and 6, data that is transmitted by PD 330 is received at midspan equipment 320. After passing through data transformer 324, the data is then transmitted on to Ethernet switch 310.

While the provision of power onto the two signal wire pairs does result in efficiency in the number of wire pairs used, it also results in the increased costs of the midspan equipment. Specifically, the midspan equipment manufacturer would now add the cost of two data transformers 322, 324 that enable data and power to be transmitted onto the same wire pairs. This is in contrast to the relatively simple design of FIG. 2, which provides an undisrupted channel connection between the switch and the end device.

In some applications, data transformers 322, 324 would be required to meet certain inductance requirements. Consider, for example, the inductance requirement that is specified by the 100BASE-TX specification for the transmit side. As the 100BASE-TX specification sets forth, the minimum inductance measured at the transmit pins shall be greater than or equal to 350 μH with any DC bias current between 0-8 mA injected. As would be appreciated, other inductance ranges (higher or lower) can also be specified for a given application. For example, a higher inductance range can be specified to accommodate higher DC bias currents that would be expected in an application such as 802.3at.

In general, the inductance requirement of the transmitter transformer in the midspan equipment is designed for operation with legacy PHY receivers. These legacy PHY receivers expect to see the effective inductance on the channel so that the signal quality and BER of the link is not impacted. This minimum inductance level can be specified to present sufficient inductance that would overcome killer patterns that cause baseline wander so that the receiver can recover. In other words, the inductor at the source slows down the edges.

In the midspan example of FIG. 3, the satisfaction of the inductance requirement by transmitting transformers 322, 324 in midspan equipment 320 would enable operation with legacy PHYs in the receivers of PD 330 and switch 310, respectively. Satisfaction of this additional inductance requirement by transmitting transformers 322, 324 further adds to the costs of the midspan equipment manufacturer.

In accordance with the present invention, the costs of the midspan manufacturers can be reduced through the elimination of the expensive data transformers. As will be described in greater detail below, the elimination of the data transformers does not compromise on the performance of the midspan in enabling power to be injected onto the signal wire pairs.

Figure 4:
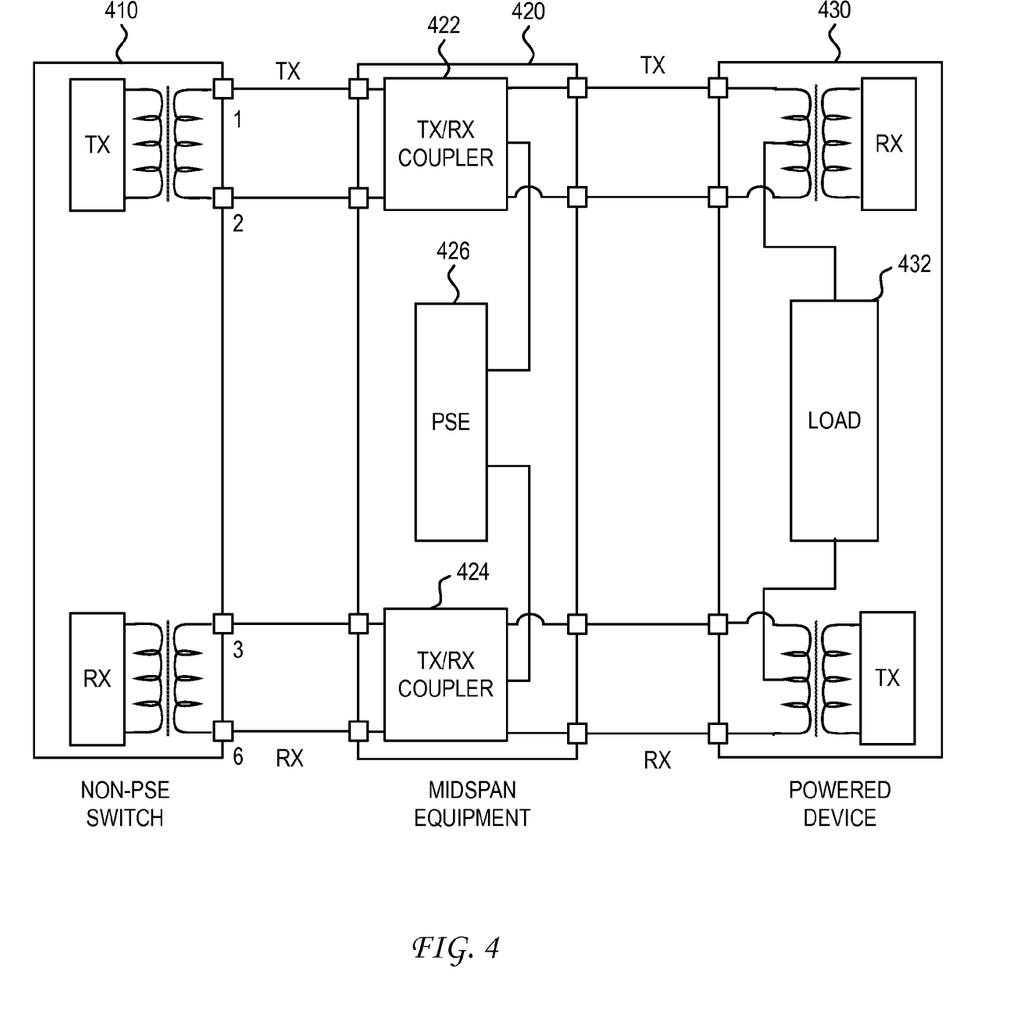
FIG. 4 illustrates an embodiment of a midspan equipment in accordance with the present invention.
Figure 5:
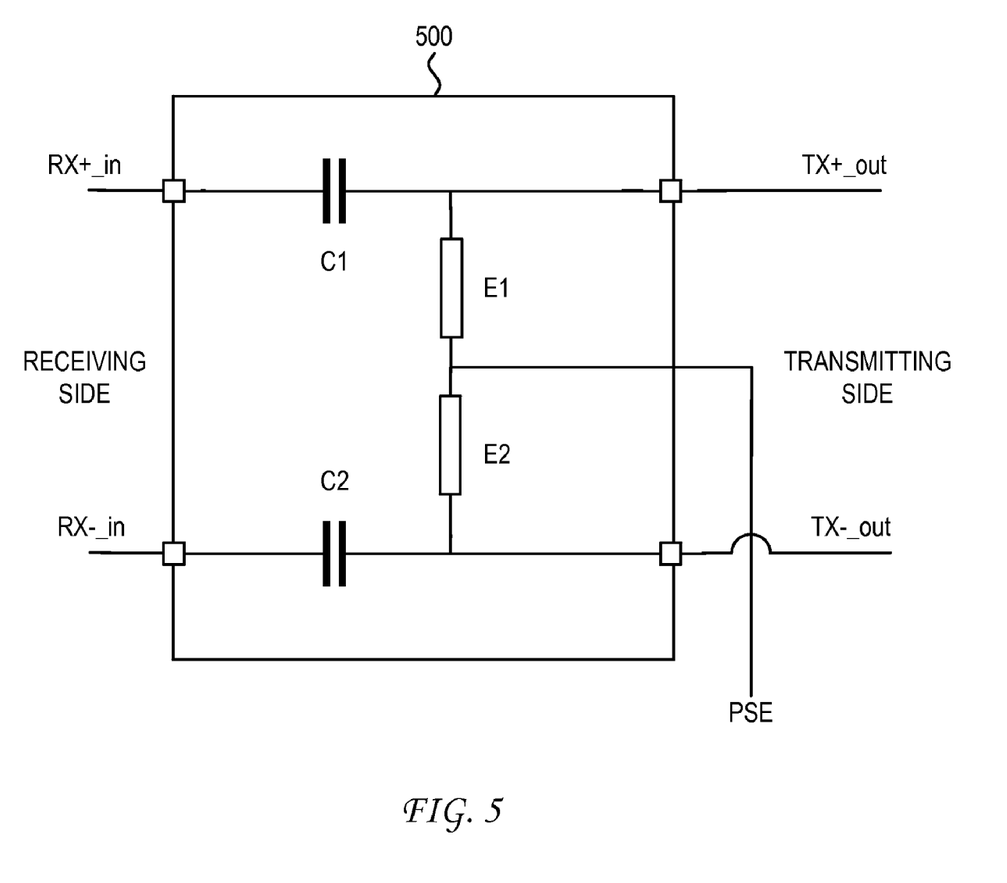
FIG. 5 illustrates an embodiment of a transmit/receiver coupler according to the present invention.

FIG. 4 illustrates a midspan equipment in accordance with the present invention that has replaced the data transformers with TX/RX couplers 422, 444. An embodiment of TX/RX couplers 422, 44 is illustrated in FIG. 5. As illustrated, TX/RX coupler 500 includes blocking capacitors C1, C2 that enables DC isolation between the two sides of TX/RX coupler 500. Specifically, blocking capacitors C1, C2 are coupled to receive ports RX+_in and RX−_in on a receiving side (i.e., from the switch or from the end device). On the transmitting side of TX/RX coupler 500, power is injected by the PSE onto the TX+_out and TX−_out ports through two divider trees created by elements E1, E2. In one embodiment, elements E1, E2 are inductor elements. In another embodiment, elements E1, E2 are low loss resistive elements. As would be appreciated, other variations of elements E1, E2 can be used to deal with various transients.

In one embodiment, TX/RX coupler 500 can be designed to present a low effective impedance at a frequency range of operation. This particular TX/RX coupler design would enable the support of legacy Ethernet switches and end devices. In general, the midspan equipment design on the transmit side is critical for ensuring proper compatibility with legacy equipment.

Figure 6:
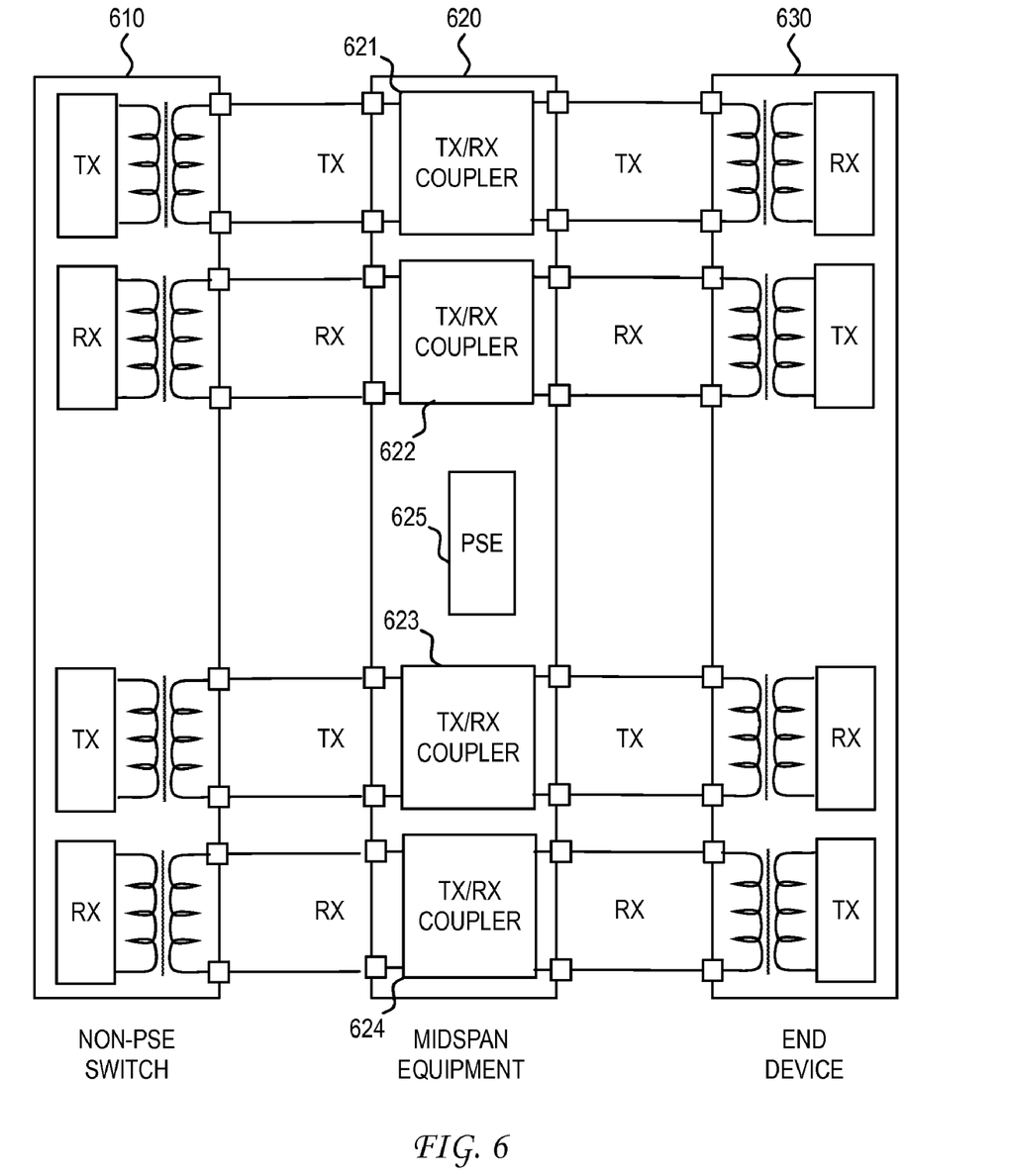
FIG. 6 illustrates an embodiment of a midspan equipment that applies to data transmission using four wire pairs.

FIG. 6 illustrates another midspan embodiment that is applied to data transmission applications such as 1000BASE-T. In this embodiment, four wire pairs are used for data transmission. Accordingly, four data transformers can be replaced by four TX/RX couplers 621-624. While the power connections are not shown, PSE 625 can be designed to inject power into one or both (e.g., 802.3at) of the two wire pair groupings. Specifically, power can be injected through TX/RX couplers 621, 622 and/or through TX/RX couplers 623, 624.

Figure 7:
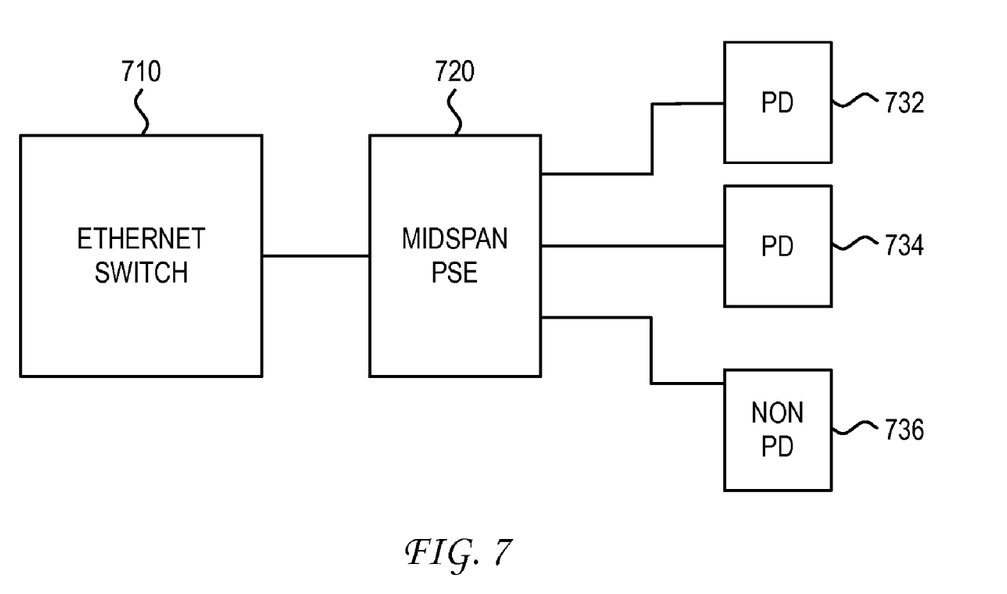
FIG. 7 illustrates an example of the support of non-PDs by midspan equipment.

As would be appreciated, the principles of the present invention would apply regardless of whether power was applied to the signal wire pairs. As such, the midspan equipment design can also support non-PD devices. These non-PD devices would not receive power since they would not be discovered as valid PD devices. FIG. 7 illustrates an example of such a scenario where PDs 732, 734 and non-PD 736 are supported by midspan PSE 720. Here, each of PDs 732, 734 and non-PD 736 can be a link partner that is attached to midspan PSE 720 and switch 710. If a TX/RX coupler in midspan PSE 520 is designed with a low effective impedance at the frequency of operation, then midspan PSE 520 can support a legacy PHY in non-PD 536, regardless of whether Ethernet switch 510 could present an appropriate inductance level.

Finally, the principles of the present invention can also be applied to medium dependent interface crossover (MDIX) ports.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A transmit/receive coupler in a midspan power sourcing equipment, comprising:
   a first blocking capacitor having a first end connected to a first input port and a second end connected to a first output port;
   a second blocking capacitor having a first end connected to a second input port and a second end connected to a second output port;
   a first circuit connected to said second end of said first blocking capacitor and to a power insertion point, wherein said point insertion point is connected to a power sourcing equipment in the midspan, wherein said first circuit includes a resistor; and a second circuit connected to said second end of said second blocking capacitor and to said power insertion point, wherein said first and second output ports are used to transmit data and power to an end device.

2. The transmit/receive coupler of claim 1, wherein said power sourcing equipment conforms to the 802.3af specification.

3. The transmit/receive coupler of claim 1, wherein said power sourcing equipment conforms to the 802.3at specification.

4. The transmit/receive coupler of claim 1, wherein said data is transmitted in accordance with 100BASE-TX.

5. The transmit/receive coupler of claim 1, wherein said data is transmitted in accordance with 1000BASE-T.

6. A midspan power sourcing equipment, comprising:

a first and a second input port and a first and a second output port on a switch side;

a first and a second input port and a first and a second output port on an end device side;

a first blocking capacitor positioned in a path between said first input port on said switch side and said first output port on said end device side;

a second blocking capacitor positioned in a path between said second input port on said switch side and said second output port on said end device side;

a third blocking capacitor positioned in a path between said first input port on said end device side and said first output port on said switch side; and a fourth blocking capacitor positioned in a path between said second input port on said end device side and said second output port on said switch side;

wherein said first and second output ports on said end device side and said first and second input ports on said end device side are used to transmit data and power to said end device, wherein said power is inserted using a first circuit tree coupled to said first and second output ports on said end device side and a second circuit tree coupled to said first and second input ports on said end device side.

7. The midspan power sourcing equipment of claim 6, wherein said first circuit tree and said second circuit tree includes an inductive element.

8. The midspan power sourcing equipment of claim 6, wherein said first circuit tree and said second circuit tree includes a resistive element.

9. The midspan power sourcing equipment of claim 6, wherein said data is transmitted in accordance with 100BASE-TX.

10. The midspan power sourcing equipment of claim 6, wherein said data is transmitted in accordance with 1000BASE-T.

11. A midspan power sourcing equipment, comprising:

a first and a second input port and a first and a second output port on a switch side;

a first and a second input port and a first and a second output port on an end device side;

a first blocking capacitor positioned in a path between said first input port on said switch side and said first output port on said end device side;

a second blocking capacitor positioned in a path between said second input port on said switch side and said second output port on said end device side;

a third blocking capacitor positioned in a path between said first input port on said end device side and said first output port on said switch side; and a fourth blocking capacitor positioned in a path between said second input port on said end device side and said second output port on said switch side;

wherein said first and second output ports on said end device side and said first and second input ports on said end device side are used to transmit data and power to said end device, wherein the path between input and output ports does not use data transformers.

12. The midspan power sourcing equipment of claim 11, wherein said power is inserted using a first circuit tree coupled to said first and second output ports on said end device side and a second circuit tree coupled to said first and second input ports on said end device side.

13. The midspan power sourcing equipment of claim 12, wherein said first circuit tree and said second circuit tree includes an inductive element.

14. The midspan power sourcing equipment of claim 12, wherein said first circuit tree and said second circuit tree includes a resistive element.

15. The midspan power sourcing equipment of claim 11, wherein said data is transmitted in accordance with 100BASE-TX.

16. The midspan power sourcing equipment of claim 11, wherein said data is transmitted in accordance with 1000BASE-T.

* * * * *